United States Patent
Jenkins et al.

(10) Patent No.: US 9,122,615 B1
(45) Date of Patent: Sep. 1, 2015

(54) DATA CACHE EGRESS FOR A DATA STORAGE SYSTEM

(71) Applicant: Western Digital Technologies, Inc., Irvine, CA (US)

(72) Inventors: Dean M. Jenkins, La Canada-Flintridge, CA (US); David M. Hamilton, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 210 days.

(21) Appl. No.: 13/789,564

(22) Filed: Mar. 7, 2013

(51) Int. Cl.
*G06F 12/16* (2006.01)
*G06F 12/08* (2006.01)
*G11C 7/10* (2006.01)
*G06F 11/14* (2006.01)

(52) U.S. Cl.
CPC .......... *G06F 12/0868* (2013.01); *G11C 7/1072* (2013.01); *G06F 11/1441* (2013.01)

(58) Field of Classification Search
CPC ............ G06F 12/0866; G06F 12/0804; G06F 11/1441; G06F 11/2015; G06F 1/263; G06F 2212/312; G06F 12/0868; G06F 3/061; G06F 3/0683; G06F 1/30; G06F 2201/84; G06F 2212/2022; G06F 2212/214; G06F 1/3203; G06F 1/3206; G06F 21/60; G11C 5/141
See application file for complete search history.

(56) References Cited

U.S. PATENT DOCUMENTS

| | | | |
|---|---|---|---|
| 5,414,861 A | 5/1995 | Horning | |
| 5,519,831 A | 5/1996 | Holzhammer | |
| 6,295,577 B1 | 9/2001 | Anderson et al. | |
| 6,798,599 B2 | 9/2004 | Dykes et al. | |
| 6,901,298 B1 * | 5/2005 | Govindaraj et al. | 700/21 |
| 7,340,593 B2 | 3/2008 | Martin | |
| 7,421,552 B2 | 9/2008 | Long | |
| 7,490,203 B2 | 2/2009 | Hsu et al. | |
| 7,568,068 B2 | 7/2009 | Kulkarni et al. | |
| 7,634,585 B2 | 12/2009 | Conley et al. | |
| 7,836,339 B2 | 11/2010 | Leete et al. | |
| 7,865,679 B2 | 1/2011 | Sartore | |
| 7,954,006 B1 | 5/2011 | Mangipudi | |
| 8,015,433 B2 | 9/2011 | Chu et al. | |
| 8,261,012 B2 | 9/2012 | Kan | |
| 8,898,379 B2 * | 11/2014 | Squires et al. | 711/112 |
| 2003/0142561 A1 | 7/2003 | Mason, Jr. et al. | |
| 2006/0136765 A1 * | 6/2006 | Poisner et al. | 713/323 |
| 2007/0005883 A1 * | 1/2007 | Trika | 711/113 |
| 2008/0024899 A1 | 1/2008 | Chu et al. | |
| 2010/0100675 A1 * | 4/2010 | Furuhjelm | 711/113 |
| 2012/0173713 A1 * | 7/2012 | Wang et al. | 709/224 |
| 2013/0191578 A1 * | 7/2013 | Goss et al. | 711/102 |

* cited by examiner

*Primary Examiner* — Hashem Farrokh

(57) ABSTRACT

Data cache egress of a data storage device (DSD) in a data storage system including a system controller. A size of a reserved space in a memory of the system controller is determined for storing a data cache image for a data cache of the DSD. A loss of power is detected in the data storage system and the data cache image is transferred from the DSD to the system controller. The data cache image is stored in the reserved space in the memory of the system controller.

23 Claims, 5 Drawing Sheets

DATA CACHE EGRESS FOR A DATA STORAGE SYSTEM

BACKGROUND

A data storage system can include a system controller and multiple data storage devices (DSDs) such as, for example, hard disk drives (HDDs) and/or solid state drives. In addition to providing more capacity than a single DSD, data storage systems such as a redundant array of independent disks (RAID) or cloud storage systems can be used to safeguard data by maintaining redundant copies of data on different DSDs in the data storage system. In the event of a loss or corruption of data at one DSD, a redundant copy of the data on a different DSD can be accessed by the system controller.

The system controller in a data storage system often includes a data cache stored in a volatile memory to service read and write requests from a host. The volatile memory of the system controller can have a battery back-up to protect against a loss of unwritten data stored in the data cache which has not yet been written to a non-volatile memory of a DSD. A battery back-up, such as an uninterruptible power supply (UPS), can typically supply up to 72 hours of power to maintain data in the volatile memory of the system controller.

Despite the use of battery backed-up data caches in system controllers, unwritten data can still be lost in the event of an unexpected power loss. In particular, data to be written to a DSD can be sent from the system controller to the DSD and erased from the battery backed-up data cache of the system controller before the data is written to a non-volatile memory of the DSD. In such a situation, the lost data has often been stored in a write cache in a volatile memory of the DSD. When the DSD loses power, the write cache of the DSD is lost with the data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
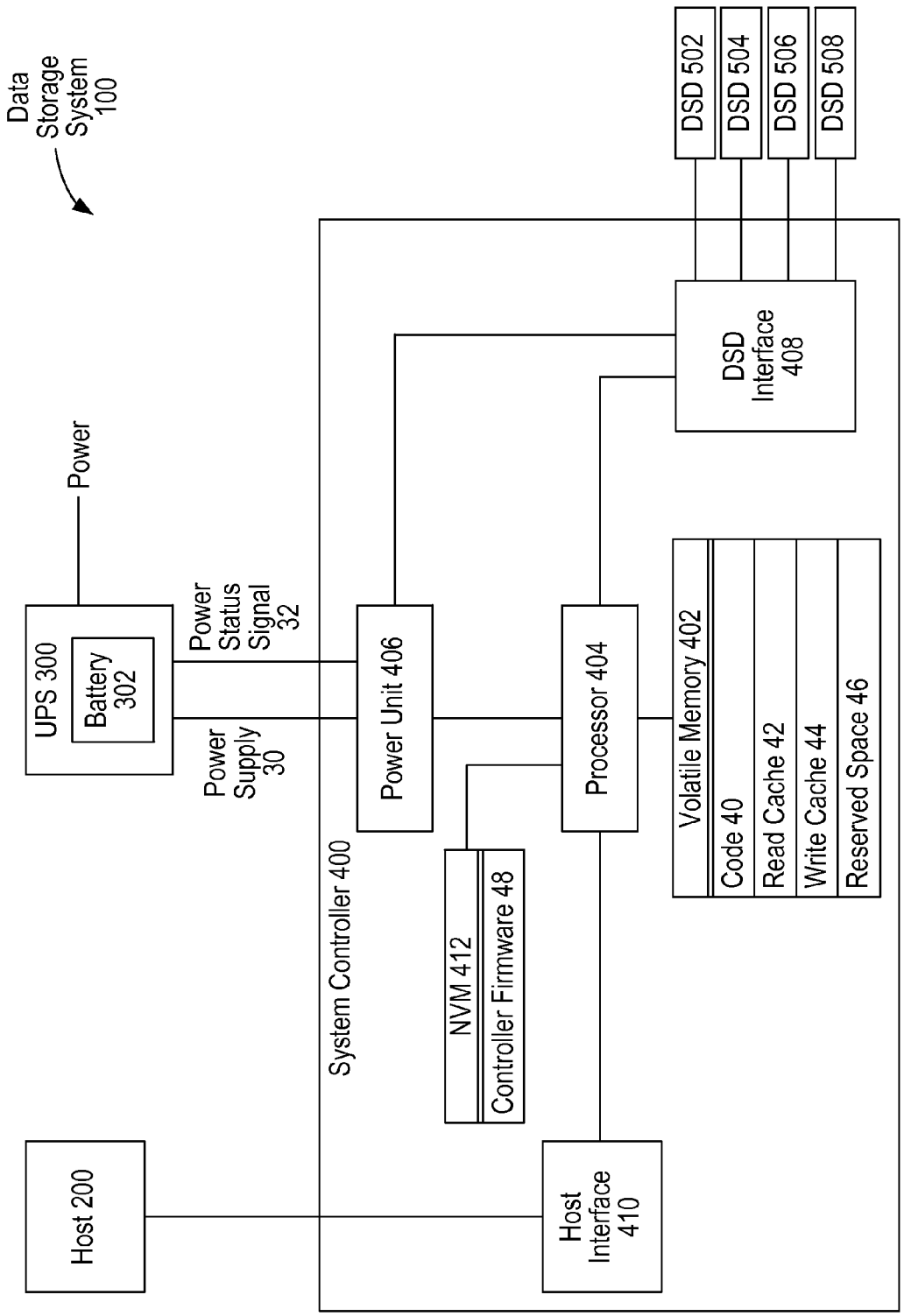
FIG. 1 is a block diagram depicting a data storage system according to an embodiment.

FIG. 1 shows data storage system 100 which includes host 200, uninterruptible power supply (UPS) 300, system controller 400, and data storage devices (DSDs) 502, 504, 506 and 508. Data storage system 100 can be, for example, a redundant array of independent disks (RAID) or a cloud storage system where data is distributed across DSDs 502, 504, 506 and 508 for improved data capacity, data back-up, and/or improved performance in reading and writing data. As understood by those of ordinary skill in the art, the components of data storage system 100 can be in one location or distributed over a network.

In the embodiment of FIG. 1, host 200 communicates with system controller 400 and provides commands for reading data from and writing data to DSDs 502, 504, 506 and 508. For its part, UPS 300 supplies power to system controller 400 and DSDs 502, 504, 506 and 508 via power supply 30. In the event of a loss of power to UPS 300, battery 302 allows UPS 300 to continue to supply power for a certain amount of time (e.g., 72 hours) to system controller 400. In the example of FIG. 1, UPS 300 also sends power status signal 32 to system controller 400 to notify system controller 400 of a power loss and/or a resumption of power after a power loss.

As shown in FIG. 1, system controller 400 includes volatile memory 402, processor 404, power unit 406, DSD interface 408, host interface 410, and non-volatile memory (NVM) 412. Power unit 406 is configured to accept power supply 30 and power status signal 32 from UPS 300. Power unit 406 is also configured to distribute power to processor 404, volatile memory 402, and DSD interface 408.

As will be understood by those of ordinary skill in the art, NVM 412 can include a solid state memory such as a flash integrated circuit. While the description herein refers to solid state memory generally, it is understood that such solid state memory may comprise one or more of various types of solid state memory such as Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. As shown in FIG. 1, NVM 412 stores controller firmware 48 which includes computer-executable instructions for system controller 400.

Volatile memory 402 can include, for example, a DRAM. Although data is lost from volatile memory without power, volatile memory 402 is generally protected from data loss since it is powered by UPS 300 which can continue to supply power in the event of a power loss.

Data stored in volatile memory 402 can include code 40, read cache 42, write cache 44, and reserved space 46. Code 40 can include computer-executable instructions for managing data in data storage system 100, such as portions of controller firmware 48 loaded into volatile memory 402 from NVM 412. Read cache 42 can include data which has been recently requested from host 200 and temporarily stored in volatile memory 402 after the requested data has been retrieved by system controller 400 from DSDs 502, 504, 506 and/or 508. Write cache 44 can include data which has been recently received from host 200 for storing in DSDs 502, 504, 506 and/or 508. As discussed in more detail below with reference to FIG. 3, reserved space 46 is a designated region of volatile memory 402 for storing data cache images for data caches of DSDs 502, 504, 506 and 508.

As shown in the example of FIG. 1, system controller 400 includes processor 404 which can perform various operations of data storage system 100 described below. Processor 404 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In the example of FIG. 1, volatile memory 402 provides information stored in volatile memory 402 to processor 404 during execution of instructions such as code 40.

Host interface 410 is configured to interface system controller 400 with host 200 and may interface according to a standard such as, for example, PCI express (PCIe), serial advanced technology attachment (SATA), or serial attached SCSI (SAS). DSD interface 408 is configured to interface system controller 400 with DSDs 502, 504, 506 and 508. As with host interface 410, DSD interface 408 may also interface according to a standard such as PCIe, SATA, or SAS. In this regard, DSD interface 408 can also provide power to DSDs 502, 504, 506 and 508.

Figure 2:
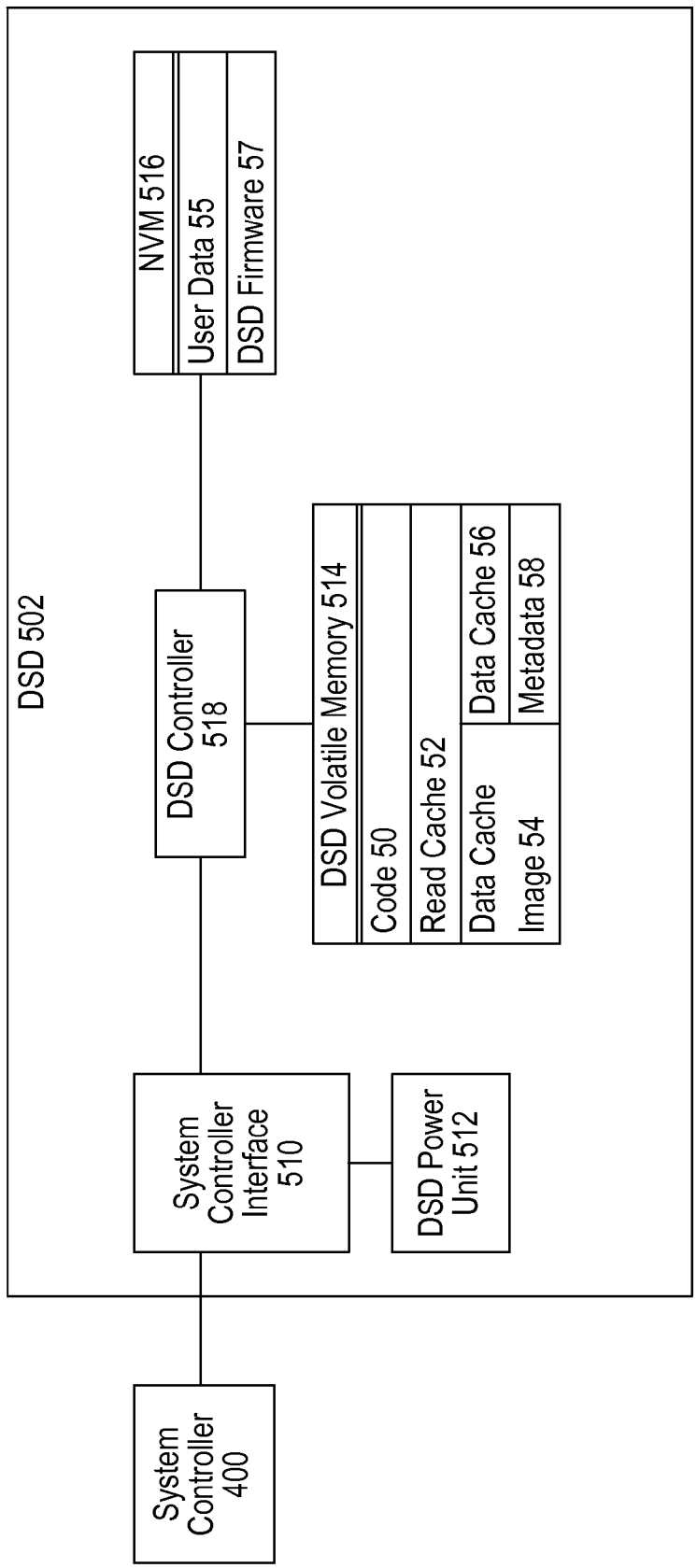
FIG. 2 is a block diagram depicting a data storage device of FIG. 1.

FIG. 2 is an example block diagram for DSD 502 of FIG. 1. As shown in FIG. 2, DSD 502 includes system controller interface 510, DSD power unit 512, DSD volatile memory 514, non-volatile memory (NVM) 516, and DSD controller 518. System controller interface 510 is configured to interface with system controller 400 to send data to and receive data from system controller 400. Such data can include, for example, user data 55 to be written to or read from NVM 516. System controller interface 510 also interfaces with DSD power unit 512 which can detect a loss of power from system controller 400. As will be understood by those of ordinary skill in the art, system controller interface 510, DSD power unit 512 and DSD controller 518 may be combined as one component in other embodiments.

As discussed in more detail below, DSD controller 518 is configured to perform various operations of DSD 502 described with reference to FIGS. 3, 4 and 5 below. DSD controller 518 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

DSD volatile memory 514 interfaces with DSD controller 518 and can be, for example, a DRAM. As shown in the example of FIG. 2, DSD volatile memory 514 can store code 50, read cache 52, and data cache image 54. Code 50 can include computer-executable instructions for managing data in DSD 502, such as portions of DSD firmware 57 loaded into DSD volatile memory 514 from NVM 516. Read cache 52 can include data which has been recently requested from system controller 400 and temporarily stored in DSD volatile memory 514 after the requested data has been retrieved from NVM 516. In the example of FIG. 2, data cache image 54 includes data cache 56 and metadata 58. Data cache 56 can include user data or other data which has been recently received from system controller 400 for writing to NVM 516. The data stored in data cache 56 may not have been stored in NVM 516 yet and therefore could be vulnerable to data loss if power is unexpectedly lost at DSD 502. As discussed in more detail below with reference to FIG. 5, metadata 58 includes information concerning the structure of data cache 56 which is used to reconstruct the state of data cache 56 in the event of a loss of power at DSD 502.

DSD 502 also includes NVM 516 which can be any form of non-volatile memory or a combination of different types of non-volatile memory. In one embodiment, NVM 516 is a magnetic disk for storing data. In another embodiment, NVM 516 is a solid state memory such as a flash memory. In yet another embodiment, DSD 502 is a hybrid drive where NVM 516 includes both a magnetic disk and a solid state memory.

Figure 3:
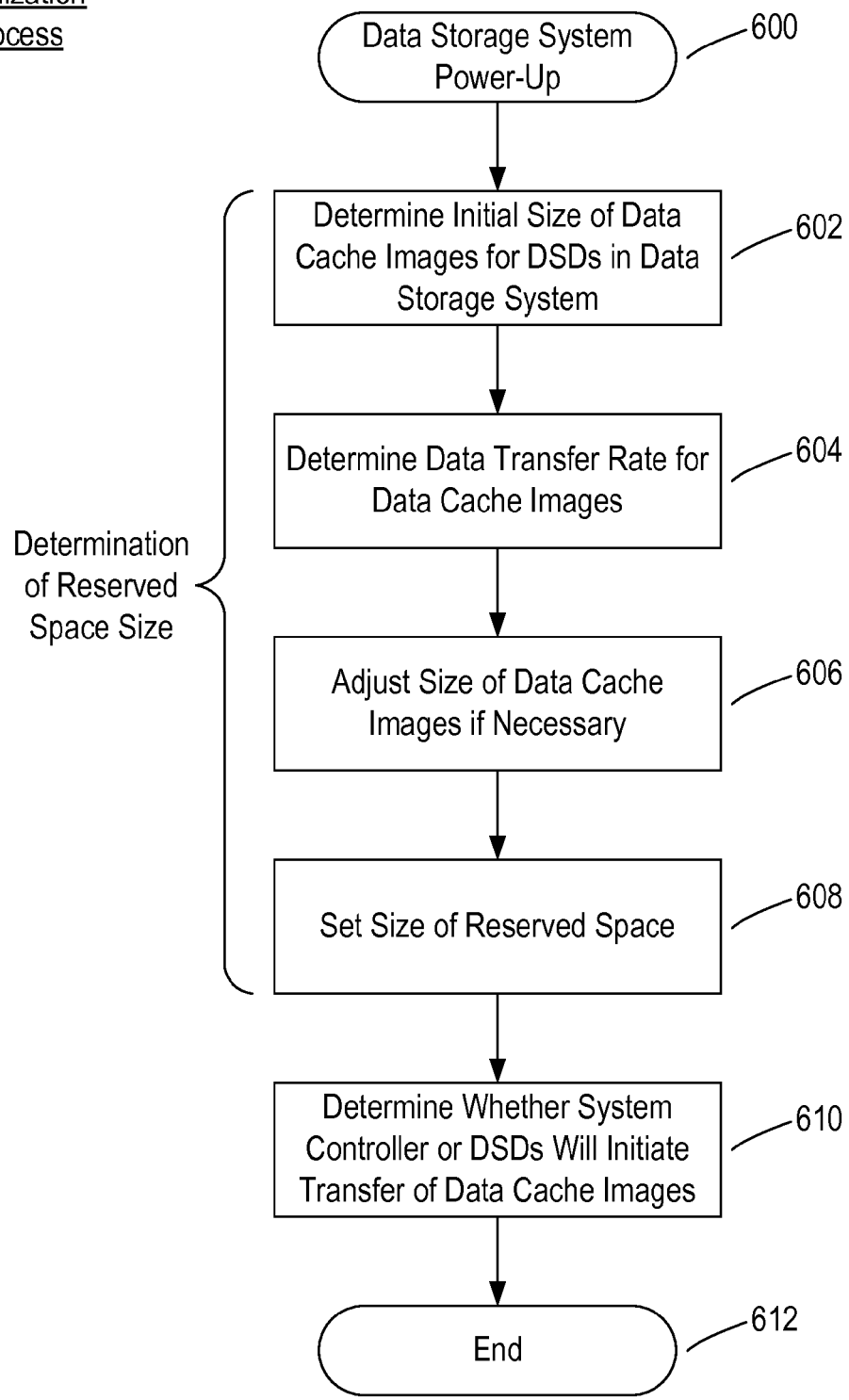
FIG. 3 is a flowchart for an initialization process of a data storage system according to an embodiment.

FIG. 3 is a flowchart for an initialization process of data storage system 100 which determines a size of reserved space 46 in volatile memory 402 of system controller 400. As discussed in detail below, reserved space 46 can be used to store data cache images of the DSDs in data storage system 100 so as to provide recovery of the data caches after an unexpected power loss.

The initialization process of FIG. 3 begins in block 600 when data storage system 100 is powered up. The example process of FIG. 3 may be performed only upon a first power-up of data storage system 100 or may be performed each time data storage system 100 is powered-up. Blocks 602 to 608 provide an example of the determination of the size of reserved space 46. In this regard, the size of reserved space 46 can be negotiated between the DSDs and system controller 400 as discussed below.

In block 602, processor 404 of system controller 400 determines an initial size of the data cache images (e.g., data cache image 54 of FIG. 2) of the DSDs in data storage system 100. This can include receiving a data cache image size from each of DSDs 502, 504, 506 and 508 via DSD interface 408. For example, if the data cache images of the DSDs each have an initial size of 20 MB, the initial size of the data cache images for DSDs 502, 504, 506, and 508 is determined to be 80 MB in block 602. In this regard, determining the size of the reserved space can be based on the number of DSDs in data storage system 100.

In block 604, processor 404 determines a data transfer rate for the data images from the DSDs to system controller 400. A faster data transfer rate will allow more data to be transferred from the DSDs to system controller 400 in the event of a power loss at one or more of the DSDs. Once a loss of power is detected in data storage system 100, a DSD may only have a certain amount of time for egress of its data cache image to system controller 400. Accordingly, the data transfer rate can be used to determine the size of reserved space 46 and/or adjust the size of the data cache images stored in the DSDs.

If necessary, in block 606, the size of the data cache images stored in the DSDs is adjusted to accommodate an available size for reserved space 46 in volatile memory 402 and/or the data transfer rate determined in block 604. The size of reserved space 46 is then set by processor 404 in block 608.

In block 610, it is determined whether system controller 400 or the DSDs will initiate transfer of the data cache images. In this regard, system controller 400 may initiate transfer by requesting the data cache image from the DSD when a power loss is detected in data storage system 100. Alternatively, a DSD may send its data cache image to system controller 400 without a request from system controller 400. The initialization process then ends in block 612.

Figure 4:
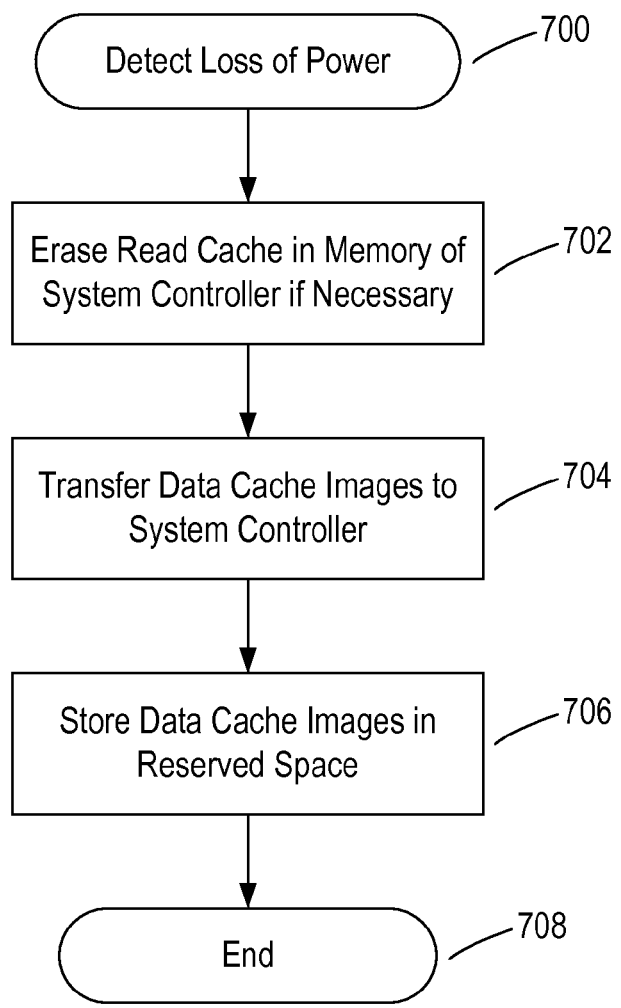
FIG. 4 is a flowchart for a power loss process of a data storage system according to an embodiment.

FIG. 4 is a flowchart for a power loss process of data storage system 100. The process begins in block 700 when a loss of power is detected in data storage system 100. The loss of power is detected, for example, by system controller 400 via power status signal 32 or detected at a DSD, such as by DSD power unit 512 of DSD 502.

In block 702, processor 404 optionally erases read cache 42 stored in volatile memory 402 of system controller 400. Processor 404 may erase read cache 42 to increase the size of reserved space 46 to allow for storage of at least a portion of the data cache images of the DSDs. In this regard, read cache 42 typically contains data which is accessible from an non-volatile memory in data storage system 100 and can usually be recovered later from the non-volatile memory.

In block 704, data cache images, such as data cache image 54 of DSD 502 are transferred to system controller 400 for storage in reserved space 46. As noted above with reference to block 610 of FIG. 3, transfer of the data cache images can be initiated by system controller 400 or by the DSDs in data storage system 100.

In block 706, the transferred data cache images are stored in reserved space 46, and the power loss process of FIG. 4 ends in block 708. By storing the data cache images in reserved space 46, it is ordinarily possible to protect loss of the data caches of the DSDs after an unexpected power loss since volatile memory 402 of system controller 400 remains powered by UPS 300. In addition, centralizing data cache egress at system controller 400 is generally less expensive than providing additional non-volatile memory at each DSD to quickly store the data caches during an unexpected power loss.

Figure 5:
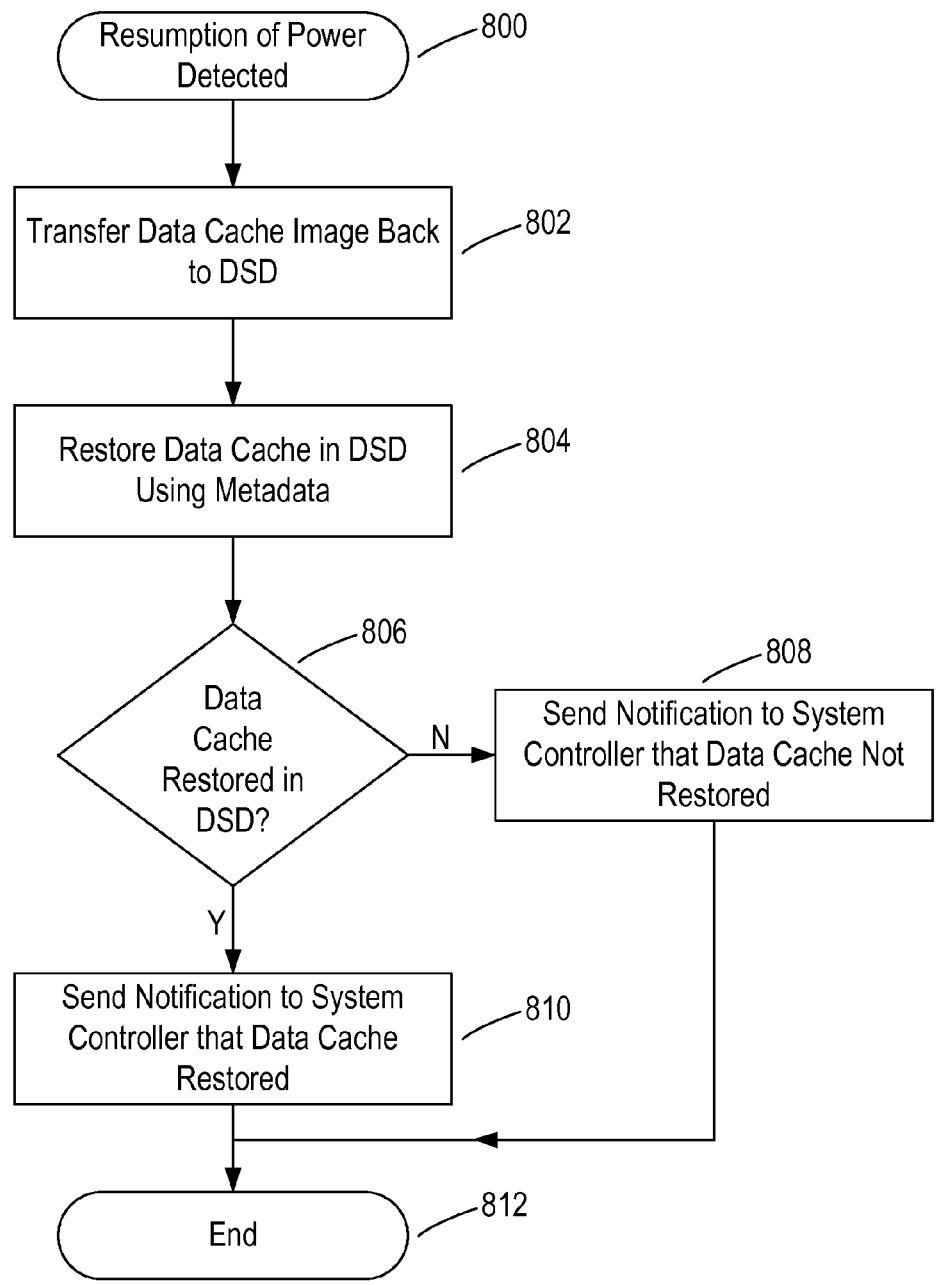
FIG. 5 is a flowchart for a power resumption process of a data storage system according to an embodiment.

FIG. 5 is a flowchart for a power resumption process of data storage system 100 which is performed after power has returned to data storage system 100. The process begins in block 800 when a resumption of power is detected in data storage system 100. The resumption of power can be detected, for example, by system controller 400 via power status signal 32 or detected at a DSD, such as by DSD power unit 512 of DSD 502.

In block 802, processor 404 transfers the data cache images stored in reserved space 46 back to their respective DSDs. The data caches of the DSDs are then restored by the DSDs in block 804 using metadata in the data cache image. Since the DSDs restore their data caches using metadata in the transferred data cache image, system controller 400 does not necessarily need to be aware of the structure of the data caches of the DSDs. In the example of DSD 502, DSD controller 518 restores data cache 56 using metadata 58 of data cache image 54.

In block 806, the DSDs check whether their data caches have been restored and then send a notification in either block 808 or block 810 to indicate the result. With reference to DSD 502, DSD controller 518 checks in block 806 to determine whether data cache 56 has been restored to DSD volatile memory 514. If not, a notification is sent by DSD controller 518 in block 808 to system controller 400 to indicate that data cache 56 has not been restored in DSD 502. System controller 400 may then try to resend data cache image 54 to DSD 502 to again attempt to restore data cache 56. On the other hand, if DSD controller 518 determines in block 806 that data cache 56 has been restored in DSD volatile memory 514, DSD controller 518 sends a notification in block 810 to system controller 400 indicating that data cache 56 has been restored. The power resumption process of FIG. 5 then ends in block 812.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for data cache egress of a data storage device (DSD) in a data storage system including a system controller, the method comprising:
   determining a size of a reserved space in a memory of the system controller for storing a data cache image for a data cache of the DSD;
   detecting a loss of power in the data storage system;
   transferring the data cache image from the DSD to the system controller in response to detecting the loss of power in the data storage system; and
   storing the data cache image in the reserved space in the memory of the system controller.

2. The method of claim 1, further comprising:
   detecting a resumption of power in the data storage system; and transferring the data cache image stored in the reserved space back to the DSD for restoring the data cache of the DSD.

3. The method of claim 2, further comprising:
restoring the data cache of the DSD based on the data cache image transferred from the system controller; and
sending a notification from the DSD to the system controller indicating that the data cache has been restored in the DSD.

4. The method of claim 1, wherein determining the size of the reserved space in the memory of the system controller includes determining a data transfer rate from the DSD to the system controller for the data cache image.

5. The method of claim 1, wherein determining the size of the reserved space in the memory of the system controller is based on a number of DSDs in the data storage system.

6. The method of claim 1, wherein determining the size of the reserved space in the memory of the system controller includes adjusting a size of the data cache image based on an available size for the reserved space and/or an amount of data that can be transferred to the system controller from the DSD after a loss of power at the DSD.

7. The method of claim 1, further comprising determining whether the system controller or the DSD will initiate the transfer of the data cache image to the system controller.

8. The method of claim 1, further comprising erasing a read cache stored in the memory of the system controller to allow for storage of at least a portion of the data cache image of the DSD.

9. The method of claim 1, wherein the system controller detects the loss of power in the data storage system.

10. The method of claim 1, wherein the DSD detects the loss of power in the data storage system.

11. The method of claim 1, wherein the data cache image transferred to the system controller includes metadata to reconstruct the data cache of the DSD.

12. A data storage system comprising:
a data storage device (DSD) including a volatile memory storing a data cache image; and
a system controller in communication with the DSD including a memory, wherein the system controller is configured to:
determine a size of a reserved space in the memory of the system controller for storing the data cache image of the DSD;
in response to detection of a loss of power in the data storage system, receive the data cache image from the DSD; and
store the received data cache image in the reserved space in the memory.

13. The data storage system of claim 12, wherein the system controller is further configured to send the data cache image stored in the reserved space back to the DSD for restoring a data cache of the DSD in response to detection of a resumption of power in the data storage system.

14. The data storage system of claim 13, wherein the DSD is configured to:
restore the data cache of the DSD based on the data cache image received from the system controller; and
send a notification to the system controller indicating that the data cache has been restored in the DSD.

15. The data storage system of claim 12, wherein determining the size of the reserved space in the memory of the system controller includes determining a data transfer rate from the DSD to the system controller for the data cache image.

16. The data storage system of claim 12, wherein determining the size of the reserved space in the memory of the system controller is based on a number of DSDs in the data storage system.

17. The data storage system of claim 12, wherein determining the size of the reserved space in the memory of the system controller includes adjusting a size of the data cache image based on an available size for the reserved space and/or an amount of data that can be transferred to the system controller from the DSD after a loss of power at the DSD.

18. The data storage system of claim 12, wherein the system controller is further configured to determine whether the system controller or the DSD will initiate transfer of the data cache image to the system controller.

19. The data storage system of claim 12, wherein the system controller is further configured to erase a read cache stored in the memory of the system controller to allow for storage of at least a portion of the data cache image received from the DSD.

20. The data storage system of claim 12, wherein the system controller detects the loss of power in the data storage system.

21. The data storage system of claim 12, wherein the DSD detects the loss of power in the data storage system.

22. The data storage system of claim 12, wherein the data cache image received by the system controller includes metadata to reconstruct a data cache of the DSD.

23. A non-transitory computer-readable medium storing computer-executable instructions for data cache egress of a data storage device (DSD) in a data storage system including a system controller, wherein when the computer-executable instructions are executed by the system controller, the system controller:
determines a size of a reserved space in a memory of the system controller for storing a data cache image for a data cache of the DSD;
in response to detection of a loss of power in the data storage system, receives the data cache image from the DSD; and
stores the received data cache image in the reserved space in the memory.

* * * * *